US009294541B2

(12) United States Patent
Dietrich et al.

(10) Patent No.: US 9,294,541 B2
(45) Date of Patent: Mar. 22, 2016

(54) METHOD AND SYSTEM FOR CORRELATION OF SESSION ACTIVITIES TO A BROWSER WINDOW IN A CLIENT-SERVER ENVIROMENT

(71) Applicant: International Business Machines Corporation, Armonk, NY (US)

(72) Inventors: Carsten Dietrich, Niedenstein (DE); Matthias Seul, Kassel (DE); Stefan Walter, Guxhagen (DE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 233 days.

(21) Appl. No.: 14/029,913

(22) Filed: Sep. 18, 2013

(65) Prior Publication Data

US 2014/0101236 A1 Apr. 10, 2014

(51) Int. Cl.
*G06F 15/16* (2006.01)
*H04L 29/08* (2006.01)

(52) U.S. Cl.
CPC .............. *H04L 67/02* (2013.01); *H04L 67/146* (2013.01); *H04L 67/148* (2013.01); *H04L 67/22* (2013.01); *H04L 67/2819* (2013.01)

(58) Field of Classification Search
CPC ....... H04L 67/02; H04L 67/22; H04L 67/146; H04L 67/148; H04L 67/2819
USPC ................................................. 709/217, 227
See application file for complete search history.

(56) References Cited

U.S. PATENT DOCUMENTS 6,052,730 A 4/2000 Altman et al.
6,182,129 B1* 1/2001 Rowe ................ G06F 17/30899
707/E17.119
7,188,181 B1* 3/2007 Squier ..................... G06F 21/41
709/228
7,502,835 B1 3/2009 Cheng
(Continued)

FOREIGN PATENT DOCUMENTS

WO WO02/44923 A1 6/2002
WO 2011119803 A2 9/2011
WO WO2011029748 2/2012

OTHER PUBLICATIONS

Tredoux, Gavan, A Method for Allowing Multiple User Sessions from a Web Browser to a Web Server Application, IPCOM000027844D, Feb. 29, 2000, http://ip.com/IPCOM/000027844.

*Primary Examiner* — Kristie Shingles
(74) *Attorney, Agent, or Firm* — Cantor Colburn LLP

(57) ABSTRACT

The present invention provides an improved method for correlation of session activities to a browser window in a client-server environment. The method includes intercepting data traffic between client and server; submitting requests to server and responses to client; monitoring all incoming client requests and server responses; looking for a session identifier and identifying corresponding marker locations for incoming browser requests missing the session identifier at a predefined main marker location; incoming client requests are intercepted, a correlation response and a session identifier is sent to a requesting client for repeating client request including the session identifier at predefined marker locations; using the session identifier for all subsequent requests originated by client, all predefined main marker locations containing the session identifier are removed and client requests are recorded and associated with the session identifier marking client request with a specific marker containing the session identifier and submitted to the server.

18 Claims, 7 Drawing Sheets

(56) References Cited

U.S. PATENT DOCUMENTS

| | | | |
|---|---|---|---|
| 7,886,217 B1* | 2/2011 | Henzinger | G06F 17/3089 715/205 |
| 8,127,017 B2* | 2/2012 | Rivera | H04L 67/141 709/227 |
| 2003/0046268 A1* | 3/2003 | Hirabayashi | 707/1 |
| 2004/0054784 A1 | 3/2004 | Busch et al. | |
| 2005/0071464 A1 | 3/2005 | Kuwata et al. | |
| 2006/0031442 A1 | 2/2006 | Ashley et al. | |
| 2006/0080321 A1* | 4/2006 | Horn et al. | 707/10 |
| 2008/0262911 A1* | 10/2008 | Altberg et al. | 705/14 |
| 2011/0093474 A1 | 4/2011 | Etchegoyen | |
| 2012/0021828 A1* | 1/2012 | Raitt et al. | 463/31 |
| 2012/0028707 A1* | 2/2012 | Raitt et al. | 463/31 |
| 2013/0225282 A1* | 8/2013 | Williams et al. | 463/29 |

* cited by examiner

METHOD AND SYSTEM FOR CORRELATION OF SESSION ACTIVITIES TO A BROWSER WINDOW IN A CLIENT-SERVER ENVIROMENT

CROSS-REFERENCE TO RELATED APPLICATION

This application claims priority under 35 U.S.C. §119 from Patent Application No. GB1217734.1 filed Oct. 4, 2012, the entire contents of which are incorporated herein by reference.

BACKGROUND OF THE INVENTION

1. Field of the Invention

The present invention relates in general to the field of filtering internet traffic in a client-server environment, and in particular to a method and a system for correlation of session activities to a browser window in a client-server environment. Still more particularly, the present invention relates to a data processing program and a computer program product for correlation of session activities to a browser window in a client-server environment.

2. Description of the Related Art

When operating proxy services with included content filtering the tracking of individual user's activities can become troublesome. Separating individual user's browsing sessions to the individual browser tab/window is usually not possible without evaluating the client's IP address, port and authentication.

Also even if these details are available they cannot reflect the user's environment properly, because the browser re-uses a single connection for multiple tabs, a firewall is performing network address translation for the connection, a forward proxy is combining the traffic of multiple users, and the users work on a terminal server and appear to be coming all from the same IP address. User-based authentication is not available or users share a single account.

The most obvious and widely used solution today for correlation of session activities to a browser window in a client-server environment is creating a "plugin" which is installed into the user's browser and captures the user's surfing activities and sends them to a different server for recording/archiving.

This solution however has a lot of problems and limitations that hamper the widespread use and create further problems. There are dozens of browsers available on the market (Internet Explorer, Mozilla Firefox, Google Chrome, Apple Safari, Opera, etc.) and every browser has an own "variant" of how plugins are implemented, so code can only be shared on a very basic level between each plugin variant. Further, every browser allows different actions and access to the user's activities. Most browsers run on a very diverse base of operating systems, sometimes requiring the plugin to be adapted to work under certain operating systems. Additionally the plugin has to be installed on each user's browser, the plugin has to be maintained and updated alongside with updates from the browser vendors, and new versions of the plugin have to be rolled out and distributed to the users.

In the Patent Application Publication US 2006/0031442 A1 "METHOD AND SYSTEM FOR EXTERNALIZING SESSION MANAGEMENT USING A REVERSE PROXY SERVER" by Ashley et al. a method, system, and computer program product for providing access to a set of resources in a distributed data processing system is disclosed. A reverse proxy server receives a resource request from a client and determines whether or not it is managing a session identifier that was previously associated with the client by the reverse proxy server; if so, it retrieves the session identifier, otherwise it obtains a session identifier and associates the session identifier with the client providing information that is managed by the reverse proxy server. The reverse proxy server then modifies the resource request to include the session identifier and forwards the modified resource request to an application server. The disclosure is targeted at checking and maintaining the authentication for a single domain using either SSL sessions or cookies specific to that domain or explicit connection. It makes no attempts at associating the session identification with user's requests to other domains or content embedded from foreign domains. Additionally it has to rely on user-driven authentication to create the context of a single user entity.

In the Patent Application Publication US 2004/0054784 A1 "METHOD, SYSTEM AND PROGRAM PRODUCT FOR TRACKING WEB USER SESSIONS" by Bush et al. a method, system, and program product for tracking web user sessions is disclosed. Specifically a user requests a web page on a user system. When the web page is delivered from the web server, program code within the web page is executed to generate a unique identifier corresponding to the web page. The unique identifier includes a unique value that corresponds specifically to the web page and a time stamp indicating the date and/or time the web page was delivered to the user. An initial communication that includes initial web page data (e.g., the referring source, etc.) and the unique identifier is then transmitted from the user system to an analytics system. The analytics system will then transmit a session cookie pertaining to a current web user session back to the user system. All subsequent communications from the user system to the analytics system will include additional web page data as well as the unique identifier and session cookie. The unique identifier and session cookie are used to correlate the additional web page data with the initial web page data. The disclosure tracks users using cookies only. The cookies have to be delivered from the accessed webserver itself. The disclosure cannot track users across different domains and also cannot track users' individual browser windows.

BRIEF SUMMARY OF THE INVENTION

The present invention provides a method for correlation of session activities to a browser window in a client-server environment. The method includes: implementing correlation means to intercept and manipulate data traffic between client and a server; submitting requests to the server and submitting responses to the client; tracking and monitoring incoming client requests and server responses; looking for a session identifier; identifying corresponding marker locations containing the session identifier, where for an incoming browser request missing the session identifier at a predefined main marker location the incoming client request is intercepted and a correlation response attached with a session identifier is sent to a requesting client for repeating the client request including the session identifier at predefined marker locations; using the session identifier for all subsequent requests originated by the client, and wherein for all predefined main marker locations containing the session identifier, all session identifiers are removed and details of the client request are recorded and associated with the session identifier; marking the client request with a specific marker containing the session identifier; and submitting as marked the request to the server.

An information processing system for execution in a data processing system for correlation of session activities to a browser window in a client-server environment including: a memory; a processor communicatively coupled to the memory; and software code portions communicatively coupled to the memory and the processor, wherein the processor is configured for performing a method including: implementing correlation means to intercept and manipulate data traffic between client and a server; submitting requests to the server and submitting responses to the client; tracking and monitoring incoming client requests and server responses; looking for a session identifier; identifying corresponding marker locations containing the session identifier, where for an incoming browser request missing the session identifier at a predefined main marker location the incoming client request is intercepted and a correlation response attached with a session identifier is sent to a requesting client for repeating the client request including the session identifier at predefined marker locations; using the session identifier for all subsequent requests originated by the client, and wherein for all predefined main marker locations containing the session identifier, all session identifiers are removed and details of the client request are recorded and associated with the session identifier; marking the client request with a specific marker containing the session identifier; and submitting as marked the request to the server.

BRIEF DESCRIPTION OF THE DRAWINGS

A preferred embodiment of the present invention, as described in detail below, is shown in the drawings, in which.

DETAILED DESCRIPTION OF THE PREFERRED EMBODIMENTS

Figure 1:
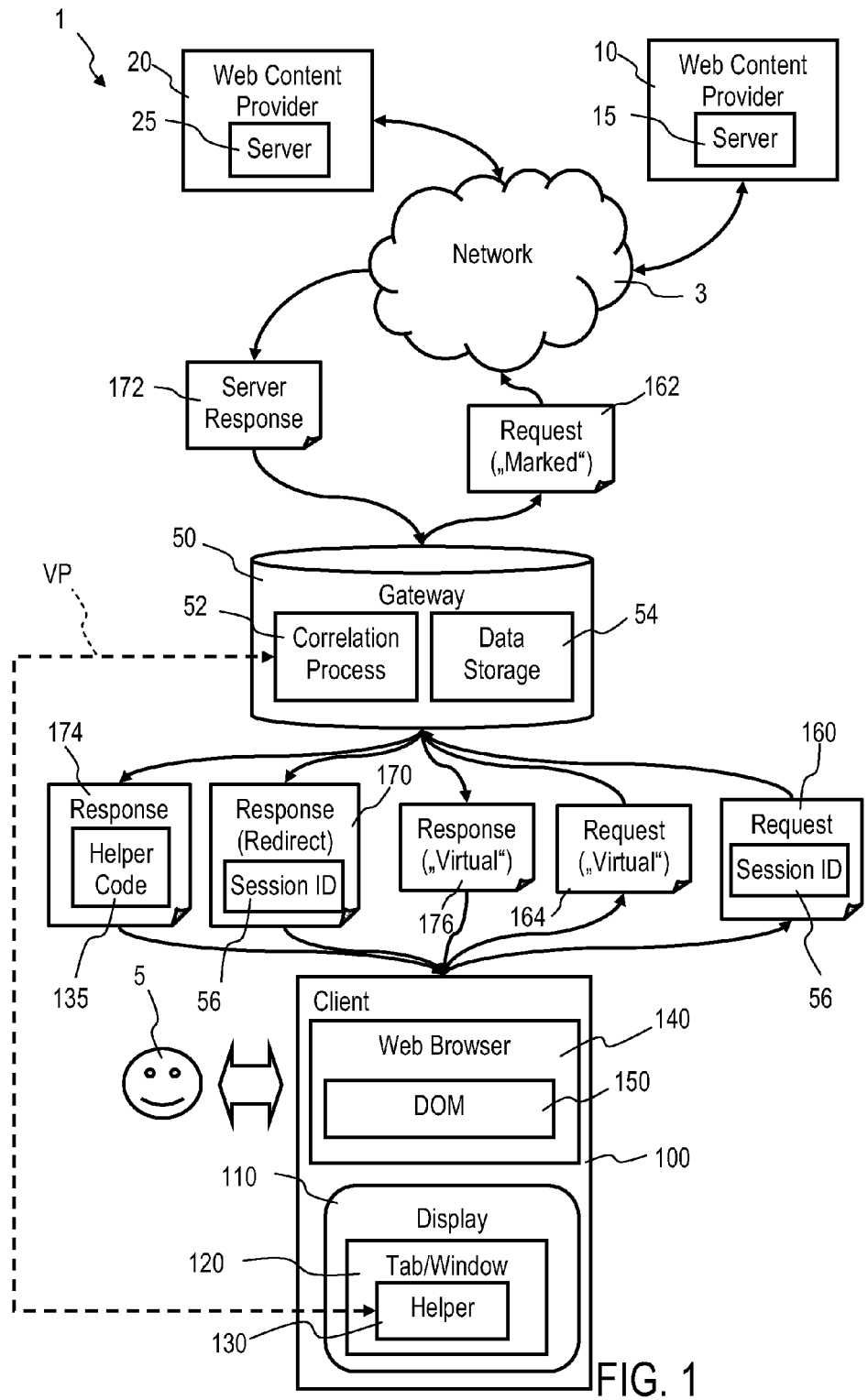
FIG. 1 is a schematic block diagram of a client-server environment performing a method for correlation of session activities to a browser window, in accordance with an embodiment of the present invention.

The technical problem underlying the present invention is to provide a method and a system for correlation of session activities to a browser window in a client-server environment, which are able to track contents of a user's browsing session on a per-tab basis and to solve shortcomings and pain points of prior art client-server environments.

The present invention provides a method for correlation of session activities to a browser window in a client-server environment, a system for correlation of session activities to a browser window in a client-server, a data processing program for correlation of session activities to a browser window in a client-server environment, and a computer program product for correlation of session activities to a browser window in a client-server environment.

Accordingly, in an embodiment of the present invention a method for correlation of session activities to a browser window in a client-server environment includes: implementing correlation means to intercept and manipulate data traffic between client and server and to submit requests to the server and to submit responses to the client; tracking and monitoring all incoming client requests and server responses; looking for a session identifier and identifying corresponding marker locations containing the session identifier; wherein if an incoming browser request is missing the session identifier at one or more predefined main marker location the incoming client request is intercepted and a correlation response attached with a session identifier is sent to a requesting client for repeating the client request including the session identifier at predefined marker locations and using the session identifier for all subsequent requests originated by the client; and wherein for all predefined main marker locations are containing the session identifier, all session identifiers are removed and details of the client request are recorded and associated with the session identifier, and the client request is marked with a specific marker containing the session identifier and submitted as marked request to the server.

In further embodiments of the present invention, a new session identifier is sent to the requesting client in case the incoming browser request has no session identifier or a detected session identifier is sent to the requesting client if one or more predefined marker location is carrying the session identifier.

In further embodiments of the present invention, the target server ignores the specific marker representing text information containing the session identifier in the marked request.

In further embodiments of the present invention, the client-server environment uses a Hypertext Transfer Protocol (HTTP) for communication, wherein a first main marker location represents an extension to a uniform resource locator of the request, and a second main marker location represents a cookie attached to the request.

In further embodiments of the present invention, an auxiliary marker location represents a referrer attached to the client request.

In further embodiments of the present invention, the specific marker represents an "X-Header" containing the session identifier.

In further embodiments of the present invention, incoming server responses are reported and a corresponding originating marked request is evaluated to determine a corresponding session identifier written in the specific marker of the originating marked request.

In further embodiments of the present invention, the incoming server response is submitted to a corresponding client if no content modification is possible, and if content modification is possible the incoming server response is unpacked and data of the server response is read.

In further embodiments of the present invention, helper object code is injecting into a response submitted to the client executing the received response and running a corresponding helper object in a corresponding browser window, wherein the helper object is injected by the helper object code as part of the browser window.

In further embodiments of the present invention, the helper object implements a virtual path and/or virtual domain for a bidirectional communication with the correlation means using standard messages of the HTTP.

In further embodiments of the present invention, the helper object has a unique instance identification and reports regularly which session identifier has been assigned to the current browser window the helper object is running in, wherein only one helper object is active running inside a given browser window.

In further embodiments of the present invention, the correlation means establishes persistent user identification in the virtual domain for a corresponding session identifier, wherein the helper object recognizes the user identification to load corresponding custom settings for information display and/or behavior from the virtual domain.

In another embodiment of the present invention, a data processing program for execution in a data processing system includes software code portions for performing a method for correlation of session activities to a browser window in a client-server environment when the program is run on the data processing system.

In yet another embodiment of the present invention, a computer program product stored on a computer-usable medium, includes computer-readable program means for causing a computer to perform a method for correlation of session activities to a browser window in a client-server environment when the program is run on the computer.

In another embodiment of the present invention, a system for performing the method for correlation of session activities to a browser window in a client-server environment includes correlation means to intercept and manipulate data traffic between client and server and to submit requests to the server and to submit responses to the client; wherein the correlation means tracks and monitors all incoming client requests and server responses, looks for a session identifier and identifies corresponding marker locations containing the session identifier; wherein the correlation means intercepts the incoming client request if the session identifier is missing at one or more predefined main marker location of the client request and sends a correlation response attached with a session identifier to a requesting client for repeating the client request including the session identifier at predefined marker locations and using the session identifier for all subsequent requests originated by the client; wherein if all predefined main marker locations contain the session identifier, the correlation means removes all session identifiers from the incoming client request, records details of the client request in a data storage and associates the client request with the session identifier, and wherein the correlation means marks the client request with a specific marker containing the session identifier and submits the client request as marked request to the server.

The present invention creates the ability to track the contents of a user's browsing session on a per-tab basis, and requires no installation of plugin software inside the user's browser or the user's operating system. The use of a gateway, like a proxy server, between the client and the server to implement embodiments of the present invention should be enough to enable tracking and correlation of session activities to a browser window.

Embodiments of the present invention can track a user across different domains and associate traffic to a specific web browser window even if the content displayed in that window is received from multiple, even foreign, domains. Also embodiments of the present invention can track users' activities inside individual browser windows and associate traffic with specific browser windows regardless of the domains making up that specific window. Embodiments of the present invention can track and identify a unique user regardless of the website surfed to and follow a session across multiple domains. It can additionally keep track of the user's activity in different browser windows and associate activities which each browser window. The session tracking capabilities require no changes to the web page source code at all, leaving any and all links intact.

Embodiments of the present invention can establish a stable identification without any user-driven authentication. This identification is retrieved and available regardless of the domain the user is accessing. Embodiments of the present invention do not need any modifications to the browser and handle session management on the gateway. Embodiments of the present invention can deploy a helper object into the browser to extend the window tracking capabilities but this requires no changes to the browser itself. Also even if the extended window tracking is removed, the basic user session tracking will still work properly.

Embodiments of the present invention use Hypertext Markup Language (HTML) code injection and manipulation of browser sessions to achieve consistent session tracking. To realize this embodiments of the present invention access the stream of outgoing requests and incoming responses passing http proxy service. Embodiments of the present invention can modify the requests being sent to the internet and the answers provided back to the client. Therefore embodiments of the present invention are implemented using the Internet Content Adaption Protocol ICAP (RFC 3507), for example, to communicate with the proxy service. But the invention is not limited to work over Internet Content Adaption Protocol ICAP.

The present invention manipulates the web browser's behavior by code injection and request redirection to make it an accomplice for the target of session tracking. The result of this injection is that the browser will accept specific markers set by embodiments of the present invention when starting subsequent requests. These markers allow tying individual requests passing through the proxy server to the internet and their responses to the page displayed inside a user's browser tab and/or window. This allows embodiments of the present invention to track browser tabs and or windows although the concept of "tabs" and "windows" being a visual concept is foreign to it. Additionally, no installations of any plugins or extensions to neither the operating system nor the user's browser are required. Embodiments of the present invention can be provided by simply pointing a user's browser to a HTTP proxy sever running the method for correlation of session activities to a browser window in a client-server environment, in accordance with embodiments of the present invention.

As will be appreciated by one skilled in the art, aspects of the present invention can be embodied as a system, method, or information processing system. Accordingly, aspects of the present invention can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the present invention can take the form of an information processing system embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the present invention, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electro-magnetic, optical, or any suitable combination thereof. A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium, including but not limited to wireless, wireline, optical fiber cable, RF, etc., or any suitable combination of the foregoing.

Computer program code for carrying out operations for aspects of the present invention can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

Aspects of the present invention are described below with reference to flowchart illustrations and/or block diagrams of methods, information processing systems, and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce a non-transitory article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
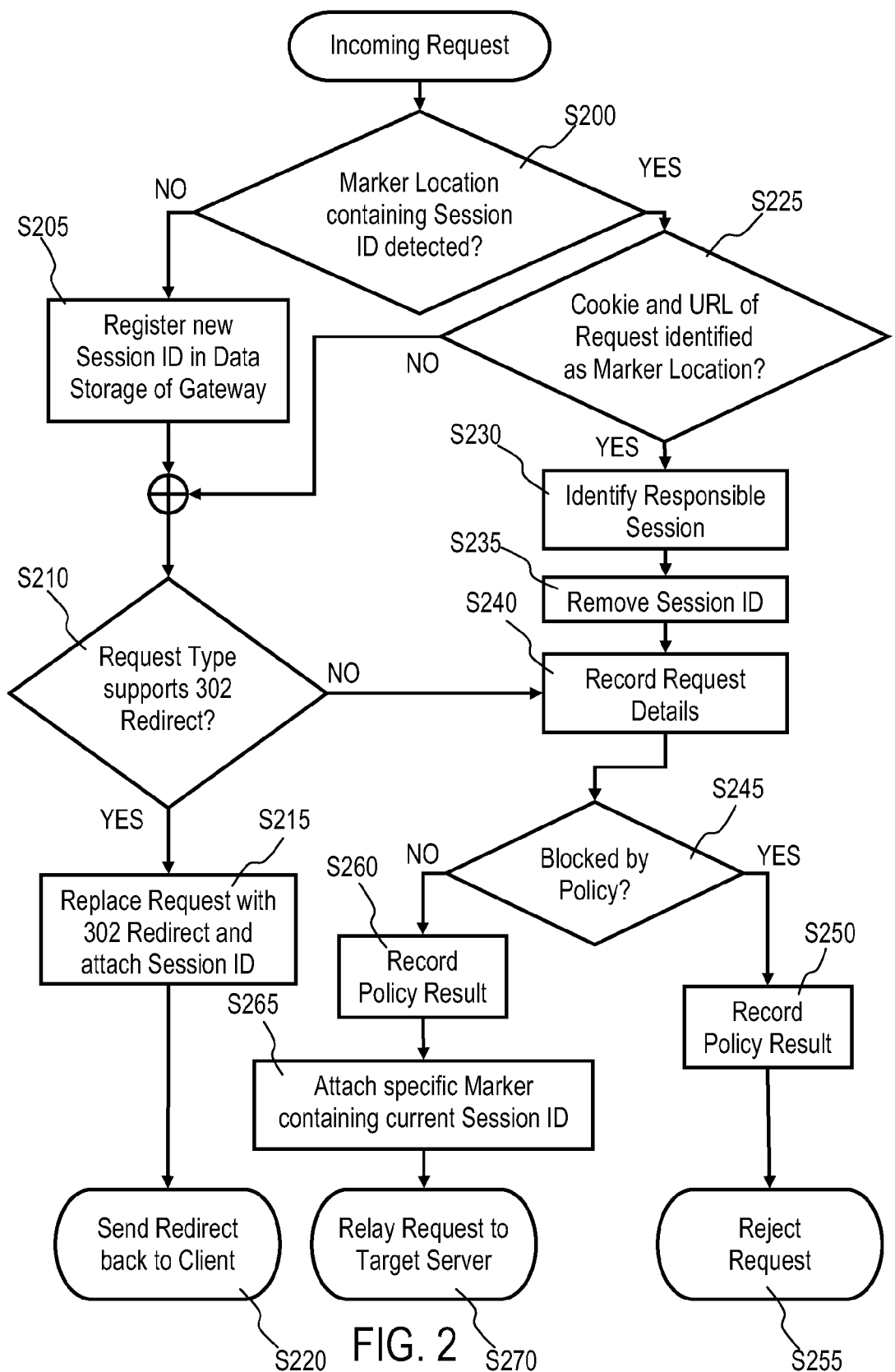
FIG. 2 is a schematic flow diagram of an identification assignment and readout process, in accordance with an embodiment of the present invention.

FIG. 1 shows a client-server environment 1 performing a method for correlation of session activities to a browser window 120, in accordance with an embodiment of the present invention; and FIG. 2 shows an identification assignment and readout process, in accordance with an embodiment of the present invention.

Referring to FIG. 1, in an embodiment of the present invention, the client-server environment 1 includes at least one client 100 and at least on Web content provider 10, 20 with at least one server 15, 25 using a network 3 for communication. The at least one client 100 is connected to the network 3 by use of a gateway 50. The client 100 runs a web browser 140 and includes display 110 to view tabs/windows 120 created by the web browser 140.

Filtering of Internet traffic, a common security measure in companies, provides protection against malicious websites as well as productivity hampering activities. The usual setup for a traffic filtering infrastructure consists of a central gateway 50 handling and monitoring all outgoing requests and their associated responses. Products like the Squid web proxy or Microsoft ISA/Forefront Server are real-world implementations of such gateways 50. When such a gateway 50 has been set up users' web browsers 140 no longer connect directly to the servers 15, 25 but instead forward the request to the gateway 50. The gateway 50 in turn will analyze the request, apply company policies if necessary and then forward the request to the intended destination. The response to a request is also received by the gateway 50 and first analyzed before relaying it to the client 100 it was intended for.

Gateways 50 are mostly transparent to the users 5 as they should not worry about how and by what requests are handled. As long as requests are handled without interference this poses no problem. As soon as company policies restrict access to certain sites (for example shopping portals) users 5 should be given proper feedback why a specific request has not been served as expected by the gateway 5. Otherwise they can suspect a malfunctioning website or even call the helpdesk to report an issue with the internet access. To address this issue existing products have mostly replaced the websites requested with custom responses ("Blockpages") which tell the user 5 why the request was rejected.

For today's interconnected websites this procedure is no longer workable. The internet of today no longer includes a singular monolithic website or portal but instead relies on the flexibility of third-party components such as widgets, buttons and other add-ons. The most common type of these third-party components are the "Like" and "Tweet" buttons offering integration with Facebook and Twitter directly from within other pages. Also some of the modern services like Facebook or Google provide authentication models for other pages. This allows users 5 of said services, for example, to use their Facebook login to authenticate on a non-Facebook page. Applying a current web filter to this kind website architecture will most likely achieve the indented effect of blocking, for example, Facebook if not deemed productive by company policy. However the users 5 will not receive proper notification of this change. Since most of the third-party services integrate via JavaScript operating in the background the blocked page delivered by the gateway 5 will not be visible to user. Even worse, pages relying on services now blocked by the web filter can suddenly stop working without the user 5 getting any indication why since they cannot see the blocked page.

An embodiment of the present invention gives direct feedback to the user inside the client 100 and/or web browser 140 that shows if and what content has been blocked. Furthermore this feedback is directly tied to the content the users are viewing. If users 5 have multiple browser windows/tabs 120 open, filtering provides the users 5 with feedback of blocked content in the context of the window 120 the content was intended to be displayed.

Most of the prior implementations focus entirely on tracking the user's activity on the gateway 50. Display of information is largely neglected and if offered requires the installation and maintenance of custom client code. Embodiments of the present invention offer a way to associate user activity with a session unique to a specific browser window 120 as well as providing a channel back to said window 120 to display the gathered information in context. This information is not aimed at filtering users' traffic or enforces blocking through policies. It is an enhancement of the feedback options to provide better transparency to users 5.

"Client", "Web Browser" and "Browser" are synonymous in the context of this invention. The invention is primarily targeted at web browsers 140 but has potential to work with any HTTP client 100 as long as the same behaviors as with Browsers 140 are present. Browser "Windows" and "Tabs" are also considered to be the same by the invention as it does not make any difference if the content is displayed in a tabbed interface on one window or in individual windows.

Referring to FIGS. 1 and 2, correlation means 52 and data storage 54 are implemented in the gateway 50 to intercept and modify data traffic between the servers 15, 25 and the client 100. To achieve this, the gateway 50 is deployed as HTTP proxy server, for example. The correlation means is realized as correlation process 52 running on an ICAP-compliant server, for example, filtering data traffic in all directions. The invention however is not limited to being integrated via ICAP as long as the initial requirement can be established. The correlation process 52 can be attached to the gateway 50 or be implemented as part of the gateway 50 itself. Alternatively the correlation process 52 can also be contained in a standalone component as long as the technical requirements are satisfied. The correlation process 52 tracks and monitors all incoming client requests 160, 164 and server responses 172, looks for a session identifier 56 and identifies corresponding marker locations containing the session identifier 56. The correlation process 52 intercepts the incoming client request 160 in case the session identifier 56 is missing at at least one predefined main marker location of the client request 160 and sends a correlation response 170 attached with a session identifier 56 to a requesting client 100 for repeating the client request 160 including the session identifier 56 at predefined marker locations and using the session identifier 56 for all subsequent requests 160 originated by the client 100. In case all predefined main marker locations are containing the session identifier 56, the correlation process 52 removes all session identifiers 56 from the incoming client request 160, records details of the client request 160 in the data storage 54 and associates the client request 160 with the session identifier 56. Finally the correlation process 52 marks the client request 160 with a specific marker containing the session identifier 56 and submits the client request 160 as marked request 162 to the server 15, 25. In the shown embodiment the client-server environment 1 uses the Hypertext Transfer Protocol (HTTP) for communication, wherein a first main marker location represents an extension to a uniform resource locator (URL) of the request 160, and a second main marker location represents a cookie attached to the request 160.

The session identifier 56 is created and attached to all requests 160 for a specific page to generate context-relevant session information. A corresponding session should be stable, so that surfing to a sub-page of the originally requested page causes the requests 160 to be attached to the same session identifier 56, and valid for all requests 160 originating from a single browser window 120. The Requests 160 are tracked from the initial page to any embedded content even if said content resides on foreign domains.

A first used mechanism is a "Referrer", which is a part of the HTTP headers sent out by the web browser 140 whenever a new request 160 is made. The referrer is used as auxiliary marker location containing a full user resource locator (URL) of the page the corresponding request 160 has been started from. This applies to all embedded content such as images, scripts and also external content such as advertising or widgets (e.g. "Like" button). The referrer is created automatically by the web browser 140 and will be attached to any and all requests 160 generated by loading a webpage or resource. This also includes requests 160 generated on-the-fly by scripts or other embedded content.

Still referring to FIGS. 1 and 2, the correlation process 52 checks all incoming client requests 160, if a specific session identifier 56 has already been attached to the request 160. Valid marker locations of the session identifier 56 inside a request 160 are user resource locator (URL) of the request 160, user resource locator (URL) of the referrer, attached to the request 160, cookies attached to the request 160.

In FIG. 2, step S200 goes to step S205, if the predefined marker locations do not contain the session identifier 56. In step S205 the correlation process 52 generates and registers a new unique session identifier 56 and registers it in the data storage 54 of the gateway 50. The session identifier 56 is suggested to be at least of 128 bit length to create enough randomness to minimize both session identifier collisions as well as session identifier guessing by malicious users. This session identifier 56 is recorded in the data storage 54 accessible to the correlation process 52 which allows the attachment of further data in the future. The request 160 made by the client 100 is then completely taken over by the correlation process 52 meaning that the request 160 will not reach an intended server 15, 25 but instead be answered by the correlation process 52 itself. If the request type supports "HTTP 302 Redirect" messages, step S210 goes to step S215. The response 170 generated by the correlation process 52 in step S215 is a "HTTP 302 FOUND" message also known as a "Redirect". The HTTP redirect messages allow servers to specify a new location or user resource locator (URL) for a client request, as well as setting cookies and other additional headers. Clients will, upon receipt of this redirect message, re-try their request with the new location specified by the server. The correlation process 52 uses this behavior to attach the session identifier 56 generated to the original user resource locator (URL). The correlation process 52 also attaches a HTTP cookie containing the session identifier 56 valid for the HTTP domain the request 160 was targeted at. The correlation process 52 also checks if the request 160 has signs of directly coming from a prior redirect and attach an additional "LOOP" identifier to the request user resource locator (URL). If this "LOOP" identifier is encountered again when evaluating the request 160, the correlation process 52 will not attempt to redirect the request 160 again as the request 160 has already been redirected multiple times. This is to prevent endless redirection by the correlation process 52 in case the user's client 100 does not correctly handle these types of requests. The behavior can be disabled to avoid misuse of the "LOOP" identifier and enforce redirection until the session identification requirements have been satisfied. If the request type and/or the client 100 do not support "HTTP 302 Redirect" messages, step S210 goes to step S240. In step S220 the redirect is sent as correlation response 170 back to the client 100.

The client 100 retries the request 160 with the new user resource locator (URL), passing along the session identifier 56. It will also feature the session identifier 56 in the referrer for all subsequent requests 160 thus creating a parent-child relationship visible to the correlation process 52 running on the gateway 50. The request 160 will upon receipt by the correlation process 52 be processed by the "session identifier present" branch of the flow diagram in FIG. 2.

If a session identifier 56 has been located in at least one of the valid marker locations of the request 160, step S200 goes to step S225 and the correlation process 52 will evaluate the session information as follows. Depending on the marker location the session identifier 56 has different priorities. Some marker locations will overrule different session identifiers 56 of other marker locations. All session identifiers 56 are checked if they are valid and known by the correlation process 52. Session identifiers 56 unknown or discarded due to lack of activity will be invalidated and not considered in the evaluation.

The lowest marker location priority has a cookie. A cookie containing the session identifier 56 is mainly a last-ditch session identification stabilization effort by the correlation process 52 to capture cases where clients 100 do not properly transmit referrers and the session identifier 56 is not contained in the request user resource locator (URL). It is also used to re-establish a session for a specific domain if the user 5 closes the browser window 120 and later on returns to the domain.

A medium priority has the referrer in the HTTP header of the request 160. Referrers will overrule cookies as they are generated as the request 160 is generated and therefore have data that is more likely to be current/accurate than cookies which can store outdated data. The referrer is used to re-establish the session identification link between a parent-page and embedded content even if the content is located on foreign domains.

The highest priority has a session identifier 56 in the request user resource locator (URL). The session identifier 56 inside the user resource locator (URL) has been assigned to the request 160 by the correlation process 52 and, if still valid, carries the highest weight.

After all marker locations have been examined, the correlation process 52 will first check if a valid session identifier 56 can be obtained for the request 160. If a session identifier 56 can be determined but is missing from either the cookies or the request user resource locator (URL), step S225 goes to step S210 and the request 160 is also handled by the behavior described in the "No session identification present" branch of the flow diagram of FIG. 2 with the exception that the determined session identifier 56 is reused instead of generating a new session identifier 56. This step is necessary to ensure requests 160 to embedded content receive the session identifier 56 attached to their user resource locator (URL) so that content embedded by them receives the proper referrer. If a session identifier 56 can be determined at the cookie and the request user resource locator (URL), step S225 goes to step S230.

Once session identification has been established for the request 160 the correlation process 52 can then analyze the request's content. Before it does this, the request 160 first identifies the responsible session in step S230 and removes session identification elements in step S235 attached by the correlation process 52 when previously redirecting it. The elements removed are all extensions of the user resource locator, the session identification cookie and the session identification as part of any referrers. The reasons for this are fidelity and compatibility. Removing the additions ensures any analysis will only see the request in the original form. Also some websites react surprisingly violent when confronted with additions to the user resource locator (URL), referrer or presence of foreign cookies. For user resource locators (URL) the most common reactions are an error message stating the presence of unsupported parameters, the page code breaking because it cannot handle the unknown parameters or simply ignoring the page requested from the host and directing to the main page instead. The background for these reactions is either technical shortfalls (display of error messages) or protection against phishing/cross-site scripting attacks (defaulting to the main page, ignoring the request user resource locator (URL)). Removing the elements before sending the request 160 out to the intended host solves these issues completely. Using the tools included in the HTTP standard instead of aggressively modifying request content is superior to existing methods as it carries no risk of breaking websites.

After cleaning the request 160 in step S235, in step S240 the correlation process 52 can record any information contained in the request 160, use the data for policy evaluation (web filter) and even modify the request 160. If the request 160 is blocked by policy, step S245 goes to step S250. Step S250 records the policy result. In step S255 the request 100 is rejected and a block page instead of the requested one is displayed because the analysis has shown a violation of company policy, for example. If the request 160 is not blocked by policy, step S245 goes to step S250. Step S260 records the policy result. In step S265 the correlation process 52 attaches a specific "X-Header" to the request 160 containing the current session identifier 56 to create a marked request 162 which can be used to identify the session identification again when a response 172 to the request 160 is intercepted. In step S270 the marked request 162 is relayed to the target server 15, 25. The target server 15, 25 ignores the specific marker representing text information containing the session identifier 56 in the marked request 162.

By the outlined steps the main goal of collecting and associating request information with a stable session identification which in turn can also be associated with a specific browser window 120 the user 5 currently has opened has been achieved. To display the relevant information in the browser window 120 a feedback channel is used which is described in the following.

Just having the information collected does not change the lack of context for the user 5. Therefore the information is delivered to the user's web browser 140 and the page associated with the given session identifier 56 is displayed. To do this, a channel is established into the user's browser window 120. The channel consists of a JavaScript-based helper object 130 which is injected into every requested HTML page's source code. The helper object 130 will then take care of establishing the channel back to the correlation process 52.

Figure 3:
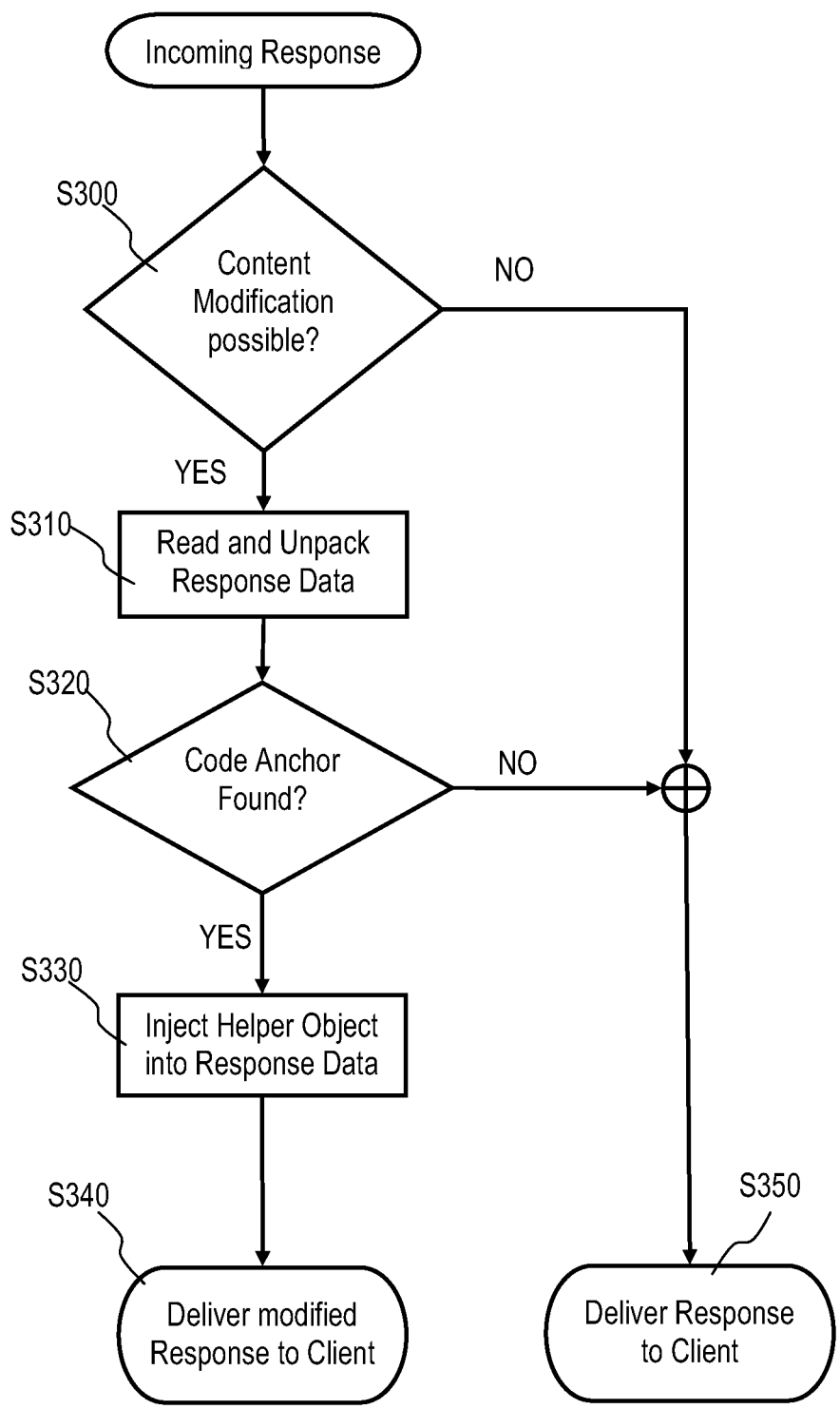
FIG. 3 is a schematic flow diagram of injecting a helper object in a client, in accordance with an embodiment of the present invention.
Figure 4:
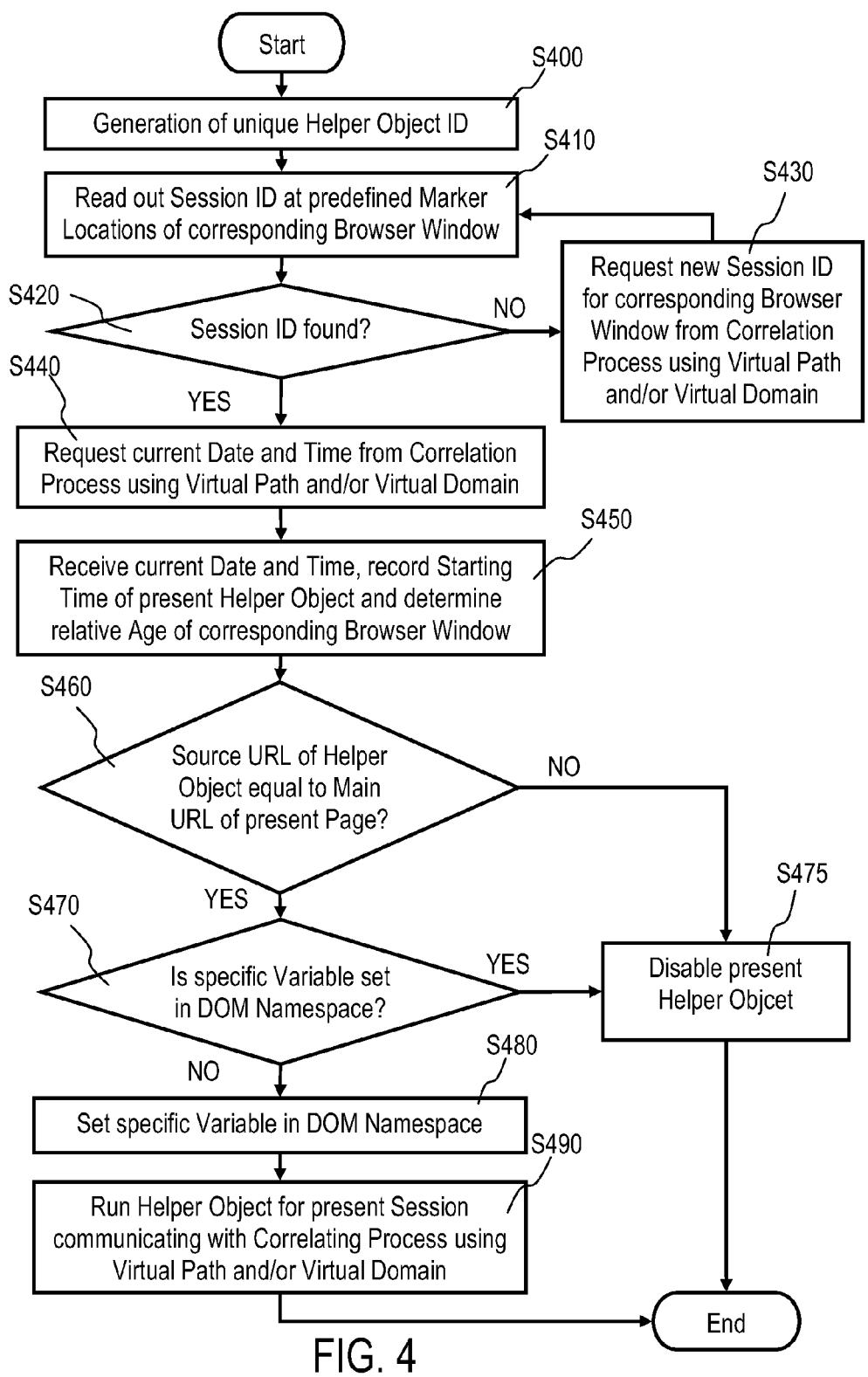
FIG. 4 is a schematic flow diagram of running the helper object in the client, in accordance with an embodiment of the present invention.

FIG. 3 shows the process of injecting the helper object 130 in the client 100, in accordance with an embodiment of the present invention; and FIG. 4 shows a process of running the helper object 130 in the client 100, shown in FIG. 1, in accordance with an embodiment of the present invention.

Referring to FIGS. 1, 3 and 4, the correlation process 52 intercepts and reports all incoming responses 172 directed to client 100. Additionally the correlation process 52 evaluates originating marked requests 162 of the incoming server responses 172 to determine a corresponding session identifier 162 written in the specific marker of the originating marked requests 162. In the shown embodiment of the present invention, the specific marker represents the "X-Header" containing the session identifier 56. After determination of the session identifier 56 the server response 172 belongs to, the correlation process 52 determines if it is possible to modify the content of the intercepted server response 172. In case no content modification is possible, step S300 goes to step S350. In step S350 the correlation process 52 delivers the incoming server response 172 to the corresponding client 100. The correlation process 52 checks, for example, if the content of the intercepted server response is HTML code by looking at the "Content-Type" header sent by the server 15, 25. If the payload of the server responses 172 are not HTML code, the server responses will not be modified and delivered directly to the client 100 as they are most likely binary downloads, images or other content the correlation process 52 does not wish or need to try establishing a channel with. Also injecting code into binary content carries the risk of breaking the content for users 5.

In an embodiment of the present invention, content modification of the server response 172 is possible, step S300 goes to step S310. In step S310 the correlation process 52 unpacks the incoming server response 172 reads the data of the server response 172. The correlation process 52 first checks the HTML payload for signs of encoding/compression and decompresses the HTML payload if necessary. The correlation process 52 will then analyze the HTML code for source anchors. Source anchors are used to position helper code 135 inside the page code to have the user's browser 140 run the helper code 135 as if it is part of the website originally requested. Valid source anchors searched for, are a HEAD portion of the HTML source code, if that fails an opening of a "BODY" element and if even that fails a "DIV" or "P" element, for example. If no code anchor is found, step S320 goes to step S350 and the correlation process 52 delivers the incoming server response 172 without modification to the corresponding client 100. In case a code anchor is located, step S320 goes to step S330 and the correlation process 52 will inject the helper code 135 into the code at the location of the code anchor and updates the header of the response 174 to reflect the increased size. In step S340 the correlation process 52 delivers the modified response 174 including the helper code 135 to the client 100.

The client 100 executes the received response 174 and runs the corresponding helper object 130 in a corresponding browser window 120, wherein the helper object 130 is injected by said helper object code 135 as part of the browser window 120. Since the helper object 130 is written in standards-compliant JavaScript and embedded into the page requested, the browser 140 will accept and treat it like any other content on that page.

This method for deployment has overcomes deploying client code by using customized browsers or plugins, as the helper object 130 is delivered as part of the response 174 and can be run out-of-the-box by any current JavaScript-capable browser 140. Newer versions of the helper code 135 can also be easily deployed, since they are not installed but instead contained in every single page a user 5 requests. Compliance to JavaScript standards also ensures that all of the current browsers 140 can run the helper object 130 flawlessly, eliminating the need to create and maintain different editions for different browser versions and types. Once active the helper object 130 has full access to the page currently being displayed in the user's browser 140.

Referring to FIGS. 1 and 4, the helper object 130 generates a unique identification for the current instance of the helper object 130 in step S400. This means, that helper objects 130 generated in other windows 120 or sub-pages have a completely different identification. In step S410, the helper object 130 reads out the session identifier 56 it is currently running under by reading the user resource locator (URL) and cookies of the current browser window 120. The helper object 130 prefers a session identifier 56 found in the user resource locator (URL) over a session identifier 56 found in the cookies. If no session identifier 56 has been located step S420 goes to step S430, and the helper object 130 requests a new session identifier 56 for the corresponding browser window 120 from the correlation process 52 using a virtual path VP and/or a virtual domain, in step S430. The communication between the helper object 130 and the correlation process 52 using the virtual path VP and/or the virtual domain is described below.

If a session identifier 56 has been located step S420 goes to step S440. In step S440 the helper object 130 requests current date and time from the system running the correlation process 52 to record at what point in time this helper object 140 has been started. This information is used to determine the relative age of a window 120. In step S450, the helper object 130 receives current date and time, and the starting time of the present helper object 130 is recorded ant the relative age of the corresponding browser window 120 is determined. Again the helper object 130 uses the virtual path VP and/or the virtual domain to communicate with the correlation process 52. The helper object 130 also ensures that only one instance of the helper object 130 is running inside a given window 120, even if the window 120 consists of multiple pages (HTML Frameset/iFrames). The helper object 130 checks if its source user resource locator (URL) is equal to the main user resource locator (URL) of the present page. If that is not the case, step S460 goes to step S475 and the helper object 130 will cease functioning and disable itself in step S475 leaving only the helper object loaded by the initial request to a web page active. If the source user resource locator (URL) of the helper object 130 is equal to the main user resource locator (URL) of the present page, step S460 goes to step S470. If a specific variable is set in the namespace of the document object model (DOM) 150 of the present browser window 120, step S470 goes to step S475 and the helper object 130 will cease functioning and disable itself in step S475 leaving only the helper object loaded by the initial request to a web page active. If the specific variable is not set in the namespace of the document object model (DOM) 150 of the present browser window 120, step S470 goes to step S480 and the helper object 130 will set the specific variable in the namespace of the document object model (DOM) 150 in step S480 to signal that it has already started and claims control of that window 120. In step S490 the helper object 130 is run for present session communication with the correlation process 52 using the virtual path VP and/or the virtual Domain.

Once the helper object 130 has started it can communicate with the correlation process 52 to collect the information gathered for the session identifier 56 for display in the browser window 120. The main limitation for the communication is the security model of the browser 140. The security model restricts access of JavaScript objects to content which is not on the same domain as the page currently viewed. This feature is known as "Same-Origin policy" and while protecting users 5 from malicious scripts sending away data it also prevents the helper object 130 from directly communicating with the correlation process 52. To circumvent this limitation the correlation process 52 creates virtual paths VP and/or virtual domains for communication with the helper objects 130. A virtual path VP is an abstract location on the domain a helper object 130 is currently being run under. This location is not on the actual server for this domain but can be recognized by the correlation process 52. If the correlation process 52 handles the virtual request 164 directly, delivering a virtual response 176 containing whatever information was requested or processing provided data. The virtual request 164 will never reach the domain's server. Using the virtual path VP the helper object 130 can directly communicate with the correlation process 52 while still abiding to the "Same-Origin Policy" restrictions. It also allows communication even without direct access to the system of the correlation process 52 since the virtual request 164 just passes through the gateway 50 picking up the virtual request 164. This is especially useful if the gateway 50 is not directly accessible (cascaded proxy) or network address translation is performed. If the access to the gateway 50 works, the communication with the gateway 50 will also work. A virtual domain is an extension of the above concept. Instead of just extending a path, the helper object 130 can also access purely virtual domain names. Again these virtual requests 164 are detected by the correlation process 52 and handled directly on the gateway 50. Using virtual domains makes it possible to create additional communication channels and even persistent storage facilities which are specific to the users machine using cookies and modern browser "Local Storage" functionality.

Using the virtual paths VP described above and the session identifier 56 retrieved from the browser window 120 the helper object 130 can now request collected data for this session from the correlation process 52. This is handled using standard HTTP requests sent to the virtual path VP, with the correlation process 52 filling the payload with its own data as requested. Since the helper object 130 is already running in the browser window 120 and the session identifier 56 is bound to that specific window 120, the helper object 130 just has to parse the result retrieved by the correlation process 52 and to display the result inside the browser window 120. Therefor the helper object 130 manipulates the displayed web page document object model (DOM) 150 to incorporate custom elements for display of information. This can be completed with current JavaScript/document object model (DOM) standards knowledge.

Figure 5:
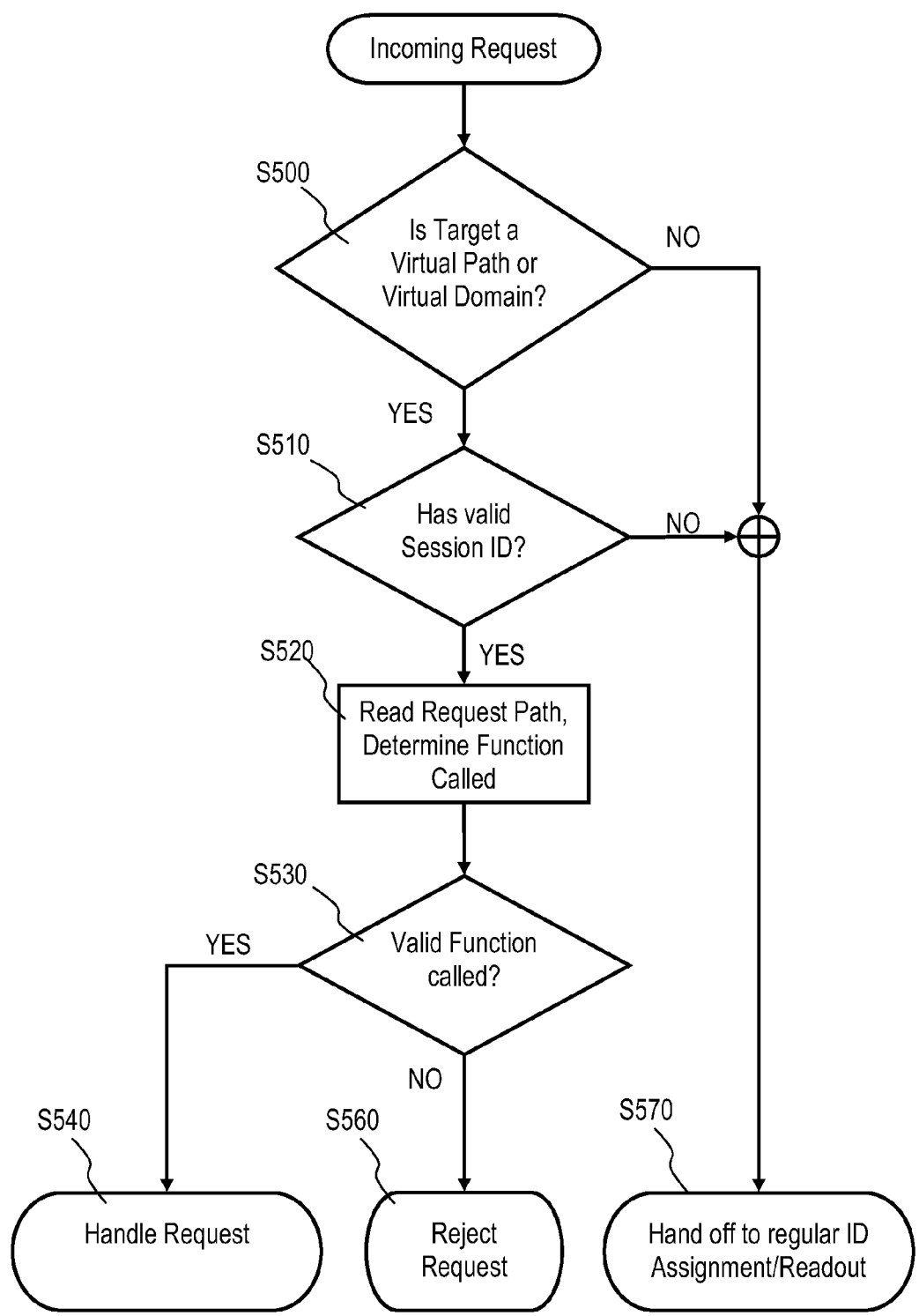
FIG. 5 is a schematic flow diagram of a communication between the helper object and correlation means, in accordance with an embodiment of the present invention.

FIG. 5 shows a communication between the helper object 130 and the correlation process 52, in accordance with an embodiment of the present invention.

Referring to both FIGS. 1 and 5, the correlation process 52 checks all incoming client requests 160, 164 if the target is the virtual path VP or the virtual domain. If the target is not the virtual path VP or the virtual domain, step S500 goes to step S570 handing off the present request to regular identification assignment and readout process shown in FIG. 2. If the target is the virtual path VP or the virtual domain, step S500 goes to step S510 checking the session identifier 56. If the present request 160, 164 has not a valid session identifier 56, step S510 goes to step S570 handing off the present request to regular identification assignment and readout process shown in FIG. 2. If the present request 160, 164 has a valid session identifier 56, step S510 goes to step S520. In step S520 the correlation process 52 reads the request path and determines the function called. If the called function is not valid, step S530 goes to step S560 rejecting the request 160, 164. If the called function is valid, step S530 goes to step S540. In step S540 the correlation process 52 handles the request 164.

Figure 6:
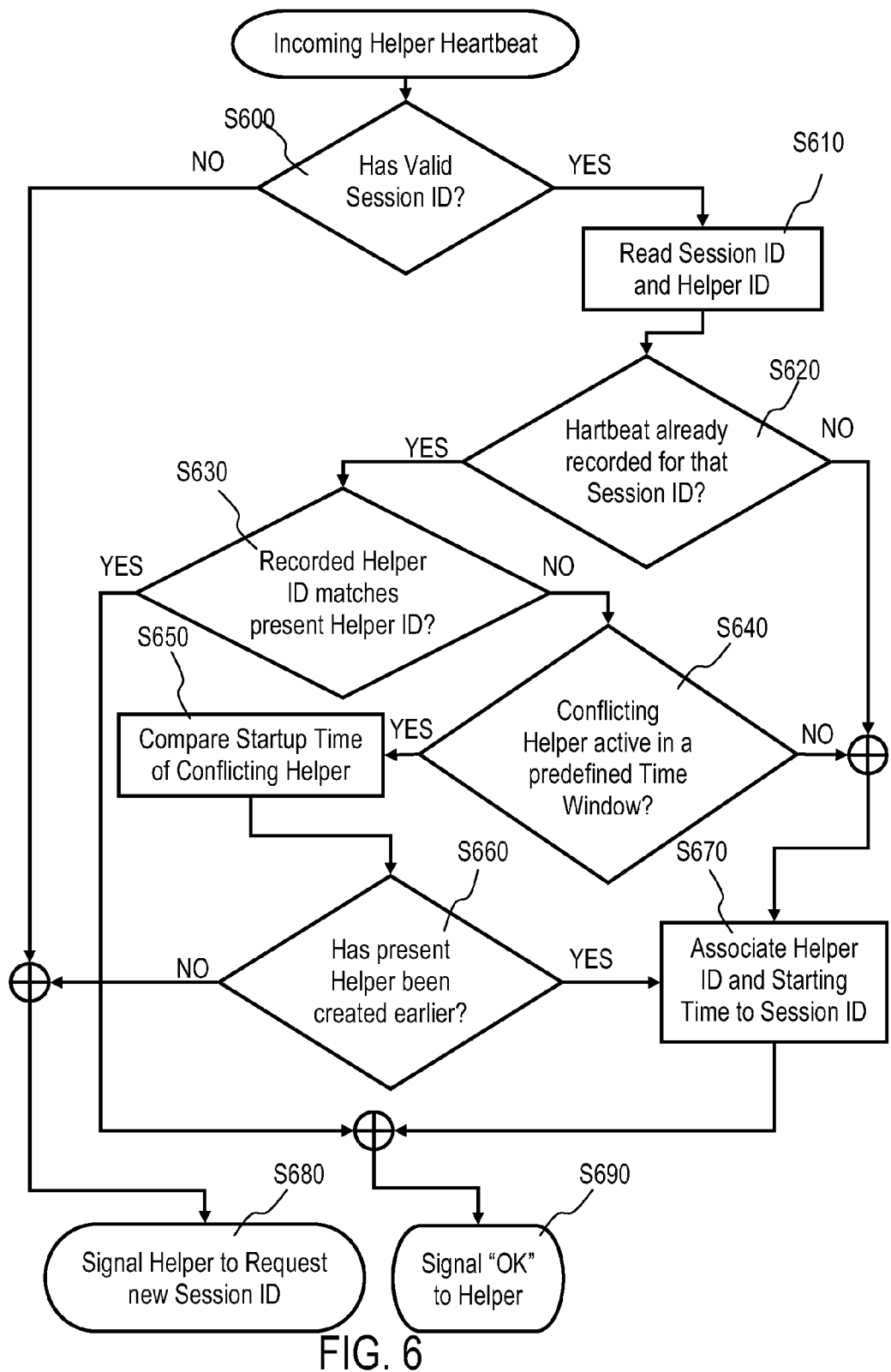
FIG. 6 is a schematic flow diagram of handling of child and/or popup windows, in accordance with an embodiment of the present invention.

FIG. 6 shows handling of child and/or popup windows, in accordance with an embodiment of the present invention.

Referring to FIGS. 1 and 6, a problematic aspect of the dependence on referrers for session tracking is that multiple windows spawned from the same browser window 120, for example through popups or the user choosing to open a link "in a new window" will receive the same session identifier 56 in the referrer. To solve this issue the unique instance identification of the helper objects 130 and startup time of the helper object 130 is used. As soon as the helper object 130 has started up and validated the session identifier 56 it sends a "Heartbeat" to the correlation process 52. This heartbeat is a simple HTTP request 164 to the virtual path VP containing the session identifier 56, the helper instance identification and the startup time. The heartbeat is sent every 1000 milliseconds, for example, and the corresponding virtual response 176 is checked by the helper object 130 for messages of the correlation process 52. Whenever the correlation process 52 receives a heartbeat it checks if the reported session identifier 56 is valid. If that is not the case, step S600 goes to step S680. In step S680 the correlation process 52 sends a virtual response 176 back to the helper object 130 telling the receiving helper object 130 to obtain a new session identifier 56 ("Session Detach"). If the session identifier 56 is valid, step S600 goes to step S610. In step S610 the correlation process 52 reads the session identifier 56 and the identification of the helper object 130. The correlation process 52 checks if in the data storage 54 a heartbeat has already been recorded for that session identifier 56. If that is not the case, step S620 goes to step S670. In step S670 the correlation process 52 associates the instance identification of the helper object 130 and the startup time with the session identifier 56, and answers the virtual request 164 with an virtual response 176 containing an information "OK" in step S690. If a heartbeat has already been recorded for the session identifier 56, step S620 goes to step S630. The correlation process 52 checks if the recorded session identifier 56 matches the session identifier 56 reported in this heartbeat. If they match, step S630 goes to step S690 and the virtual request 164 is answered with the virtual response 176 containing the information "OK". If the session identifiers 56 do not match, step S630 goes to step S640. The correlation process 52 checks if the helper object 130 already registered with this session identifier 56 was active in a predefined time window, for example in the last 1500 milliseconds. If that is not the case, step S640 goes to step S670. In step S670 the new helper instance identification of the present heartbeat and startup time is registered with the session identifier 56 and the request is answered with the virtual response 176 containing the information "OK" in step S690. If the registered helper object 130 was active in the predefined time window, step S640 goes to step S650 and the correlation process 52 compares the startup times of the conflicting helper objects 130. That means the correlation process 52 checks if the startup time of the new helper object 130 is longer ago than the startup time of the registered helper object 130. If that is the case the new heartbeat is coming from a window 120 created earlier, which has received the session identifier 56 first and step S660 goes to step S670. In step S670 the new helper instance identification of the present heartbeat and startup time is registered with the session identifier 56 and the request is answered with the virtual response 176 containing the information "OK" in step S690. If the registered heartbeat time of startup was longer ago than the newer heartbeat's than it is a "child" window, being from a popup or "Open in new Window". Here, the registration is left unchanged and step S660 goes to step S680. In step S680 the correlation process 52 sends a virtual response 176 back to the helper object 130 telling the receiving helper object 130 to obtain a new session identifier 56 ("Session Detach"). This behavior model ensures that windows opened as children from an initial window will automatically "detach" from the session forming a new one of their own. In turn this prevents session data from different windows becoming too intermingled over time if they have the same origin ensuring users 5 will only see information in the current browser window 120 related to that specific window 120.

Figure 7:
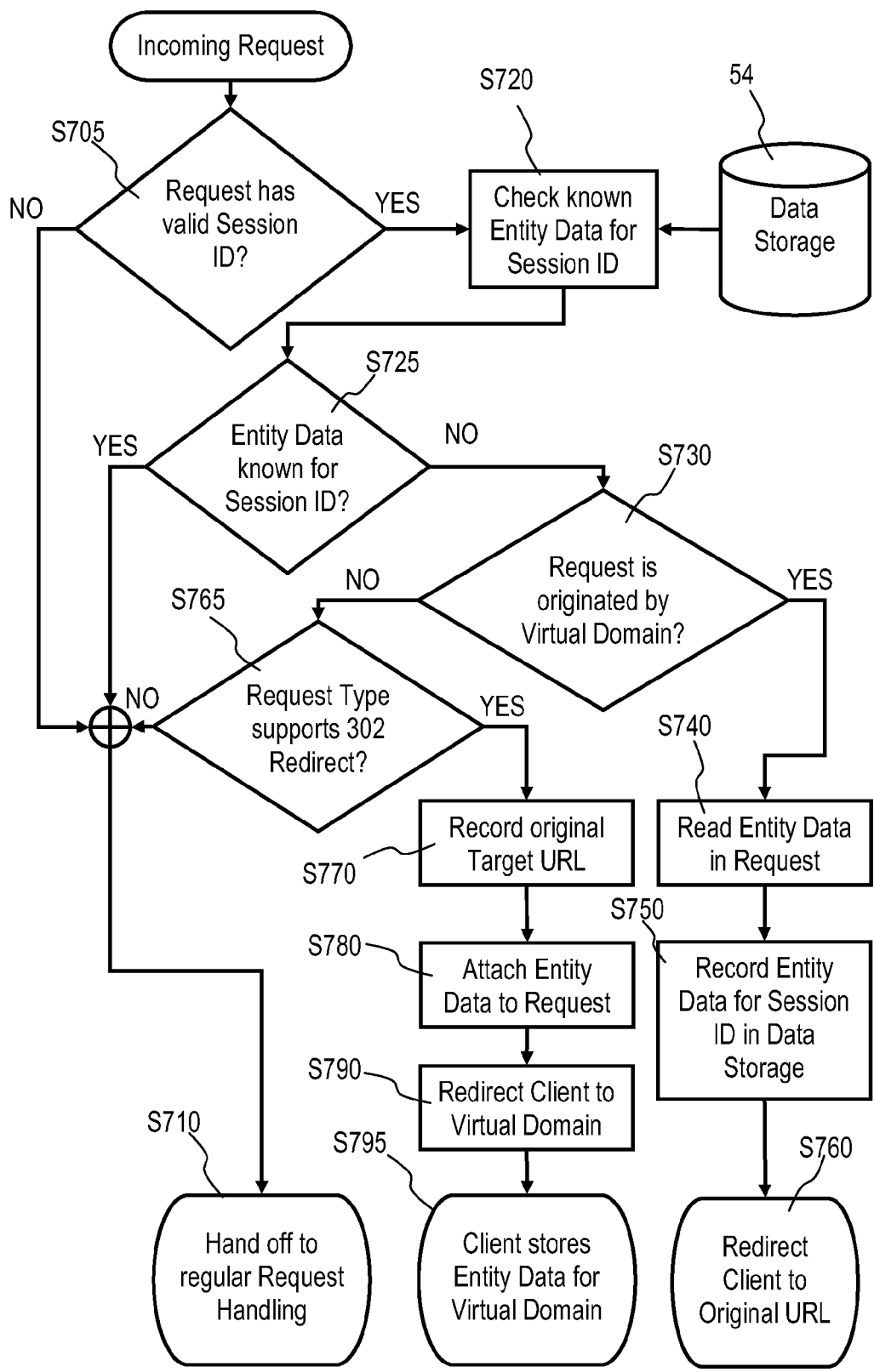
FIG. 7 is a schematic flow diagram of persistent user identification, in accordance with an embodiment of the present invention.

FIG. 7 shows persistent user identification, in accordance with an embodiment of the present invention.

Referring to FIGS. 1 and 7, when working with the helper objects 130 and displaying information inside a user's browser window 120 embodiments of the present invention are able to identify the user 5 as an entity with multiple sessions active. If authentication is required to use the gateway 50, this can be leveraged to detect the user's identity. However if authentication is not available the correlation process 52 also has the capability of establishing a persistent user identification. This can then be used to have the helper object 130 recognize the user 5 and load his/her custom settings for information display and/or behavior. The virtual domains as well as the redirect functionality are the basis for the implementation.

When a request 160, 164 is first intercepted by the gateway 50 it will be processed to generate and associate a valid session identifier 56 with it. Therefore step S705 goes to step S710. In step S710 the correlation process 52 hands off the request 160, 164 to regular request handling according to the identification assignment and readout process shows in FIG. 2. Once the identification assignment and readout process is done the correlation process 52 will check in step S720 if entity data including unique entity identification have been associated with the session identifier 56 in the data storage 54. If this is the case, step S725 goes to step S710. In step S710 the correlation process 52 hands off the request 160, 164 to regular request handling according to the identification assignment and readout process shows in FIG. 2. If no entity data including unique entity identification have been associated with the session identifier 56, step S725 goes to step S730 and the correlation process 52 checks if the request 160, 164 is originated by the virtual domain. If this is not true, step S730 goes to step S740. In step S740 the correlation process 52 reads the entity data including unique entity identification in the request 164. In step S750 the entity data including unique entity identification are recorded for the session identifier 56 in the data storage 54. In step S760 the client 100 is redirect to original uniform resource locator (URL). If this is true, step S730 goes to step S765. If the request type does not support the "HTTP 302 Redirect" step S765 goes to step S710. In step S710 the correlation process 52 hands off the request 160, 164 to regular request handling according to the identification assignment and readout process shows in FIG. 2. If the request type supports the "HTTP 302 Redirect" step S765 goes to step S770. In step S770 the uniform resource locator (URL) of the original request target is recorded. In step S780 entity data including unique entity identification are attached to the request and the client 100 is redirect to the virtual domain in step S790. In step S795 the client 100 stores the entity data and unique entity identification for the virtual domain.

The user's browser 100 will then attempt to access the virtual domain including in the resulting request, any cookies and other data stored on the user's machine for that domain. The correlation process 52 intercepts the virtual request 164 to the virtual domain, reads out the data inside the virtual request 164 and can check if entity data including unique entity identification have been stored in the cookies for the virtual domain. If that is the case the correlation process 52 can then attach the entity data including unique entity identification to the session identifier 56 the virtual request 164 is running under and afterwards redirect the request 164 to the original target recorded earlier. If that is not the case the server process will generate a new entity identification and send a redirect request that will include both the original target recorded earlier as well as a "Set-Cookie" command which includes the entity identification. This causes the entity identification cookie to become stored for the virtual domain. Since the cookie on virtual domain is specific to the machine-browser combination a user can be identified using that method.

Extensions to this concept can include a log on with the server process before an entity identification is generated thus associating the entity identification with a known user and not just a machine-browser combination. Once the entity identification has been associated with a session it can be used by the correlation process 52 subsequently to, for example, deliver settings to the helper objects unique to the entity detected, making customization easy and seamless.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which includes one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for correlation of session activities to a browser window in a client-server environment, the method comprising:
    intercepting and manipulating, by a gateway, data traffic between a client and a server and to submit requests to said server and to submit responses to said client by:
    tracking and monitoring an incoming client requests and server responses;
    looking for a session identifier;
    identifying said session identifier embedded at predetermined positions in said data traffic, wherein an incoming browser request that is missing said session identifier at a predetermined position is intercepted and a correlation response attached with said session identifier is sent to a requesting client for repeating said client request with said session identifier embedded at said predetermined position;

using said session identifier for all subsequent requests originated by said requesting client, by recording an association between said client and said session identifier;

marking said client request with said session identifier to said server;

receiving a server response from said server; and determining that said server response is in response to said client request based on said server response including said session identifier, and in response:

identifying that said server response is modifiable and in response to the server response being modifiable injecting code in said response for execution by said requesting client, wherein in response to said server response being unmodifiable said incoming server response is submitted to said requesting client.

2. The method according to claim 1, wherein said session identifier is a new session identifier for said requesting client for said incoming browser request in response to said incoming browser request being absent of a session identifier.

3. The method according to claim 1, wherein in response to detecting said session identifier at said predetermined position in said client request, forwarding said client request to said server.

4. The method according to claim 1, wherein said server ignores said session identifier represented by text information in said client request.

5. The method according to claim 1, wherein said client-server environment uses a Hypertext Transfer Protocol (HTTP) for communication, wherein a first predetermined position represents an extension to a uniform resource locator (URL) of said request, and a second predetermined position represents a cookie attached to said client request.

6. The method according to claim 5, wherein an auxiliary predetermined position represents a referrer attached to said client request.

7. The method according to claim 5, wherein said session identifier is embedded in an "X-Header" of said client request.

8. The method according to claim 1, further comprising:
in response to said server response being modifiable, unpacking said server response and reading content of said server response.

9. The method according to claim 8, further comprising:
injecting a helper object code is into said server response; and
sending said server response, with said helper object code, to said requesting client for executing said server response and running a helper object in a corresponding browser window, wherein said helper object is injected by said helper object code as part of said browser window.

10. The method according to claim 9, wherein said helper object implements a virtual path (VP) and/or virtual domain for a bidirectional communication with said gateway using HTTP messages.

11. The method according to claim 9, wherein said helper object has a unique instance identification and reports regularly which session identifier has been assigned to said corresponding browser window in which said helper object is running in, and wherein a single helper object is actively running inside a browser window.

12. The method according to claim 10, further comprising, establishing, by said gateway, a persistent user identification in said virtual domain corresponding to said session identifier, wherein said helper object recognizes said user identification to load corresponding custom settings for information display and/or behavior from said virtual domain.

13. An information processing system for execution in a data processing system for correlation of session activities to a browser window in a client-server environment comprising:
a memory;
a processor communicatively coupled to the memory; and
software code portions communicatively coupled to the memory and the processor, wherein the processor is configured for performing a method comprising:
intercepting and manipulating, by a gateway, data traffic between a client and a server and to submit requests to said server and to submit responses to said client by:
tracking and monitoring an incoming client requests and server responses;
looking for a session identifier;
identifying said session identifier embedded at predetermined positions in said data traffic, wherein an incoming browser request that is missing said session identifier at a predetermined position is intercepted and a correlation response attached with said session identifier is sent to a requesting client for repeating said client request with said session identifier embedded at said predetermined position;
using said session identifier for all subsequent requests originated by said requesting client, by recording an association between said client and said session identifier;
marking said client request with said session identifier;
submitting said client request embedded with said session identifier to said server;
receiving a server response from said server; and
determining that said server response is in response to said client request based on said server response including said session identifier, and in response:
identifying that said server response is modifiable and in response to the server response being modifiable injecting code in said response for execution by said requesting client; and
in response to said server being unmodifiable, said incoming server response is submitted to said requesting client.

14. The information processing system of claim 13, furthermore wherein:
in response to said server response being modifiable:
contents of said server response are unpacked and read; and
a helper object code is injected into said server response; and
said server response is sent, with said helper object code, to said requesting client for executing said helper object.

15. The information processing system of claim 14, wherein said helper object implements a virtual path (VP) and/or virtual domain for a bidirectional communication with said gateway using HTTP messages.

16. A computer program product stored on a non-transitory computer readable medium, comprising computer-readable program for causing a computer to perform a method for correlation of session activities to a browser window in a client-server environment wherein, when said program is run on said computer, said computer is configured for performing a method comprising:
- intercepting and manipulating, by a gateway, data traffic between a client and a server and to submit requests to said server and to submit responses to said client by:
- tracking and monitoring an incoming client requests and server responses;
- looking for a session identifier;
- identifying said session identifier embedded at predetermined positions in said data traffic, wherein an incoming browser request that is missing said session identifier at a predetermined position is intercepted and a correlation response attached with said session identifier is sent to a requesting client for repeating said client request with said session identifier embedded at said predetermined position;
- using said session identifier for all subsequent requests originated by said requesting client, by recording an association between said client and said session identifier;
- marking said client request with said session identifier;
- submitting said client request embedded with said session identifier to said server;
- receiving a server response from said server; and
- determining that said server response is in response to said client request based on said server response including said session identifier, and in response:
  - identifying that said server response is modifiable and in response to the server response being modifiable injecting code in said response for execution by said requesting client; and
  - in response to said server being unmodifiable, said incoming server response is submitted to said requesting client.

17. The computer program product of claim 16, furthermore wherein:
- in response to said server response being modifiable:
  - contents of said server response are unpacked and read; and
  - a helper object code is injected into said server response; and
  - said server response is sent, with said helper object code, to said requesting client for executing said helper object.

18. The computer program product of claim 17, wherein said helper object implements a virtual path (VP) and/or virtual domain for a bidirectional communication with said gateway using HTTP messages.

* * * * *